Patented Dec. 15, 1931

1,836,931

UNITED STATES PATENT OFFICE

ALFRED W. MEYER AND LOUIS W. HAAS, OF CHICAGO, ILLINOIS, ASSIGNORS TO THE W. E. LONG CO., A CORPORATION OF ILLINOIS

PROCESS OF IMPARTING COFFEE AROMA TO SOLUBLE COFFEE

No Drawing.   Application filed February 17, 1930.  Serial No. 429,203.

This invention relates to the method of imparting aroma to coffee and the like.

It is common practice to extract the soluble portions of the coffee bean after the same has been roasted and ground. After this extract has been separated from the woody pulp or insoluble portions of the ground coffee it is dried or evaporated and then finely ground, after which it is put up in air-tight containers and is ready for the market.

In use, the required amount of the ground soluble extract is placed in a cup or other vessel and hot water added, which dissolves the extract, after which the liquid or solution is ready to be served.

The principal objection to this product is that it does not possess the proper or sufficient coffee aroma. The principal object of the present invention is to remedy this defect by providing the extract or soluble coffee with a strong coffee aroma.

Another object of the invention is the provision of a new and improved method for imparting a strong coffee aroma to a coffee extract or soluble coffee.

A further object of the invention is the provision of a new and improved coffee extract that is impregnated with a coffee aroma so as to simulate freshly ground coffee.

A still further object of the invention is the provision of a new and improved process for continuously producing soluble coffee having the aroma of freshly roasted coffee.

Other and further objects and advantages of the invention will appear from the following description as the same proceeds.

In carrying out the process the soluble coffee granules are thoroughly mixed in a suitable mixer with a quantity of coarsely ground, freshly roasted coffee, and the mixture is preferably maintained in a closed receptacle for a sufficient length of time for the soluble coffee to absorb the desired amount of the aroma of the freshly roasted coffee.

Preferably though not necessarily, the coffee used for imparting aroma to the soluble coffee or coffee extract is freshly roasted and since it gives up its aroma more readily when ground and still more readily if used before it cools after the roasting operation, the best results are obtained if it be mixed with the soluble coffee after it is roasted and ground but before it cools.

The proportion of the freshly roasted and soluble coffee granules may vary within extremely wide limits. In the manufacture of soluble coffee, it usually requires about five pounds of the ground coffee berries to yield one pound of the soluble product. This proportion is preferably employed in performing the process since in this proportion the process can be made continuous with a minimum of trouble and expense. In this manner the ground coffee berries employed one day to impart aroma to the soluble coffee may be used the next day for obtaining the soluble coffee for use in the process for the following day, and thus insure a continued repetition of the process.

The coffee berries are preferably coarsely ground in order to facilitate the separation of the same from the finely ground extract or soluble coffee. The separation is accomplished in any suitable manner as by the use of a screen of such mesh as to permit the soluble coffee to pass through the same while the mass is moved across said screen. While the roasted coffee beans or berries are preferably ground before being mixed with the soluble coffee it is understood that the whole or unground berries may be employed, if desired.

The time employed for permitting the ground freshly roasted coffee berries to impart their aroma to the coffee extract or soluble coffee granules may also vary within extremely wide limits, but it has been found that from twelve to twenty-four hours give satisfactory results.

After the soluble coffee granules have been separated from the freshly roasted ground berries the same are preferably placed in substantially air tight containers which prevent the loss of the aroma acquired.

While the process is especially valuable for imparting coffee aroma to soluble coffee, due to the fact that most of the original aroma of the soluble coffee is abstracted by the air currents in the drying or evaporating process, and the resulting product very readily absorbs the aroma of the fresh coffee, it is understood that the process may also be used on other materials.

We claim as our invention:

1. A method of producing an aromatic coffee extract which consists in preparing a soluble extract from roasted coffee, mixing said extract with freshly roasted coffee and maintaining the coffee and extract in intimate contact to cause the extract to absorb aroma from the coffee, and finally screening the mixture to separate the coffee from the extract.

2. A method of producing an aromatic coffee extract which consists in preparing a soluble extract from roasted coffee, maintaining said extract in intimate contact with freshly roasted insoluble coffee of a different degree of fineness, and then screening the mixture to separate the soluble extract from the insoluble coffee.

3. A method of producing an aromatic coffee extract which consists in preparing a soluble coffee extract in finely divided form, mixing said extract with more coarsely ground freshly roasted coffee which still retains some of the heat of the roasting operation, maintaining the extract and the coffee in intimate contact to cause the extract to absorb aroma from the coffee, and finally screening the mixture to separate the extract from the coffee.

4. A continuous method of producing aromatic coffee extract from roasted coffee which includes preparing a soluble coffee extract from a quantity of coffee, maintaining said extract in intimate contact with a second quantity of roasted coffee to cause the extract to absorb aroma from the coffee, separating the coffee from the extract, preparing additional soluble coffee extract from said second quantity of coffee, and aromatizing said additional extract from a third quantity of coffee.

5. A method of producing aromatic coffee extract which consists in preparing a soluble extract from roasted coffee, mixing said extract with freshly roasted coffee and maintaining the coffee and extract in intimate contact for not less than twenty-four hours to cause the extract to absorb aroma from the coffee, and finally screening the mixture to separate the coffee from the extract.

In testimony whereof we affix our signatures.

ALFRED W. MEYER.
LOUIS W. HAAS.